April 23, 1963     B. I. ULINSKI     3,086,791
INDUSTRIAL TRUCK STEERING
Filed Feb. 25, 1960     2 Sheets-Sheet 1
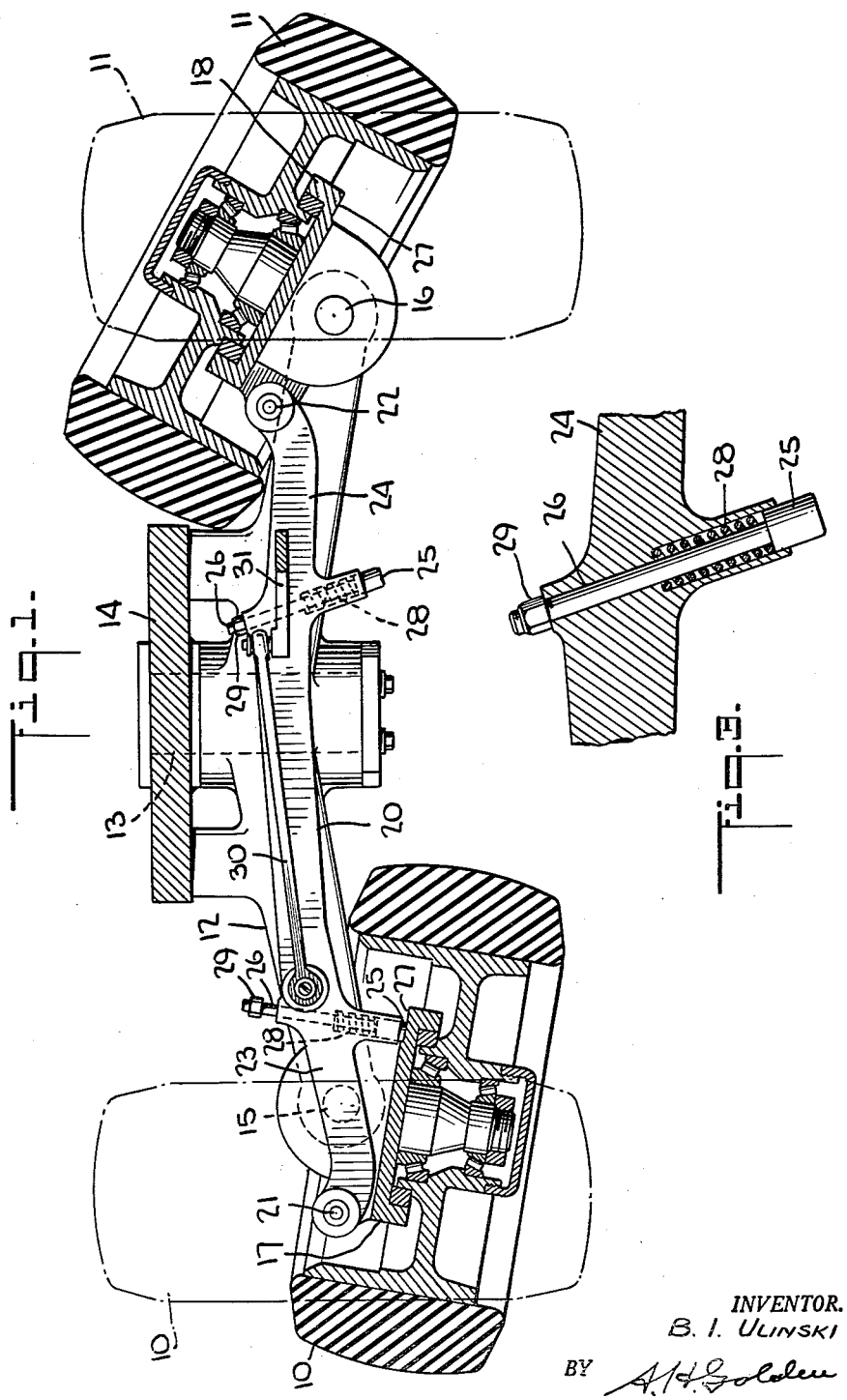
INVENTOR.
B. I. ULINSKI
BY A. H. Golden
ATTORNEY April 23, 1963 B. I. ULINSKI 3,086,791
INDUSTRIAL TRUCK STEERING
Filed Feb. 25, 1960 2 Sheets-Sheet 2
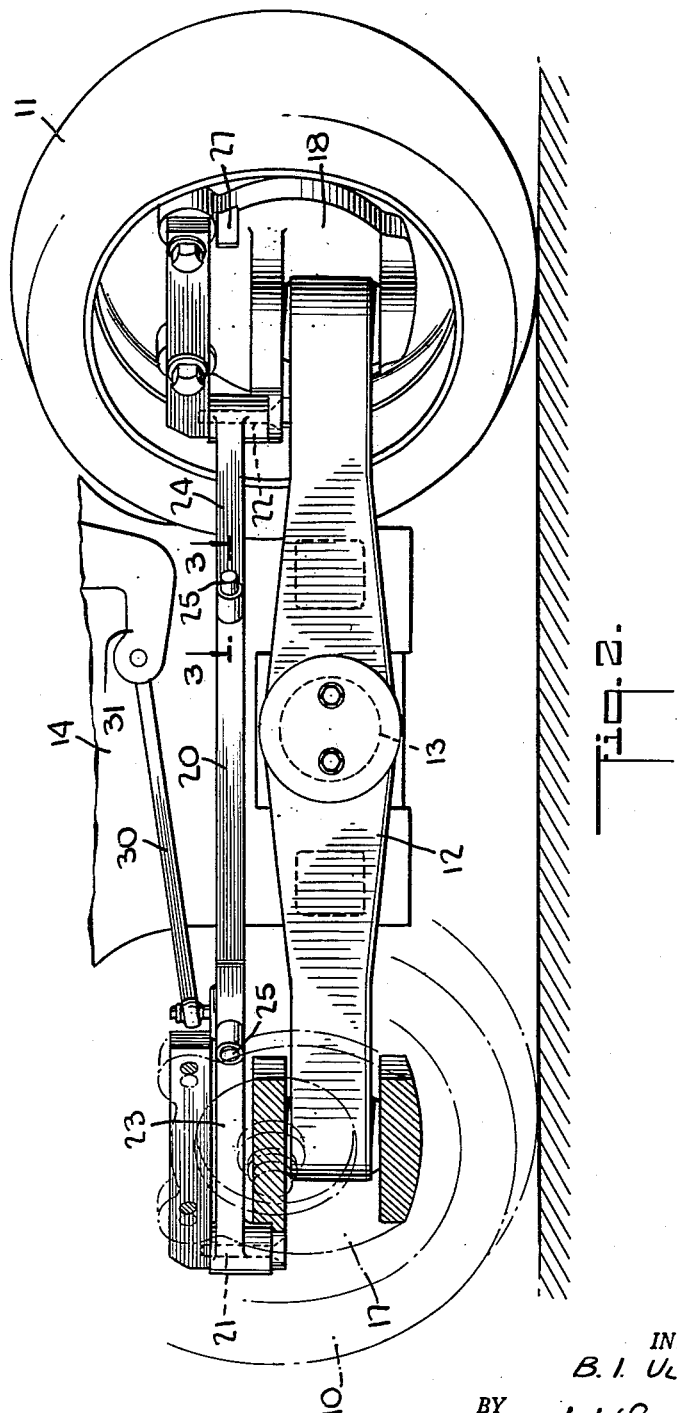
INVENTOR.
B. I. ULINSKI
BY
ATTORNEY United States Patent Office 3,086,791
Patented Apr. 23, 1963

3,086,791
INDUSTRIAL TRUCK STEERING
Bronislaus I. Ulinski, Flossmoor, Ill., assignor to The Yale and Towne Manufacturing Company, Stamford, Conn., a corporation of Connecticut
Filed Feb. 25, 1960, Ser. No. 10,953
3 Claims. (Cl. 280—95)

This invention relates to a mechanism for steering a pair of opposed wheels on an industrial truck.

To hold a pair of wheels in steering alignment, there is an advantage in utilizing a tie rod that extends between the wheels. That is because a tie rod is relatively simple and inexpensive and can be so arranged as to require little space. However, the prior art has had difficulty in utilizing a tie rod to good effect on an industrial truck because of the very wide steering angle through which the truck wheels must be steered.

The prior art generally attempts to avoid that difficulty by using between the truck wheels a relatively complicated arrangement, such as compound links. My earlier Patent No. 2,829,903 represents a considerable contribution to the art, because it shows how a simple tie rod can be used in a mechanism that effects wide angle steering. Those persons skilled in the art will appreciate that even a small increase in the steering angle will enhance the value of an industrial truck. By the exceedingly novel concept of my present invention, I make a further contribution that will enable a tie rod to be used when steering through a still greater angle than does the mechanism in my earlier patent.

In my invention, I utilize spring means that will resist the movements of a tie rod as the wheels are steered to an extreme position. The spring means then will aid a movement of the tie rod in a reverse direction, so that the tie rod will not lock the steering when designed to move very close to the steering axis of each wheel, or even into dead center relation to that axis. Thereby it is possible to design the steering mechanism to steer through an exceedingly wide angle.

As a detailed feature of my invention, I prefer to arrange the spring means to act between the tie rod and a part of the steering mounting of each wheel, so as to press the rod in a direction away from a dead center position. The spring means are so constructed that they do not operate while the wheels are steered through a considerable angle, but will be compressed between the tie rod and a wheel mounting during a final part of the steering of the wheels to an extreme position. That construction leaves the steering relatively free through a very wide angle, while enabling the tie rod to be used effectively when steering through an even greater angle.

I have thus outline rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

FIGURE 1 shows in plan a portion of an industrial truck that utilizes my novel steering mechanism;

FIGURE 2 shows a front view of the construction shown in FIGURE 1, with parts omitted in the interest of clarity;

FIGURE 3 is a section on the line 3—3 in FIGURE 2.

For the purpose of describing my novel steering mechanism, I have chosen to show in the drawings a construction like that shown in my Patent No. 2,829,903, to which I have already referred, with a pair of steered wheels 10, 11 that are mounted for steering movement on the opposed ends of an axle 12. The axle 12 is supported on a pivot shaft 13 relatively to a frame portion 14 of an industrial truck, and is equipped at its opposed ends with king pins 15, 16. The wheels 10, 11 are supported for rotation on wheel mounting members 17, 18, those members in turn being supported on the king pins 15, 16 to mount each wheel 10, 11 for rotation about a steering axis.

I indicate by the numeral 20 a tie rod much like the one shown in my earlier patent. Thus, the tie rod is arranged above the axle 12, and is connected to the opposed wheel mountings 17, 18 through pivots 21, 22 so as to hold the truck wheels 10, 11 in steering alignment. The pivots 21, 22 are so positioned on wheel mountings 17, 18 that end portions 23, 24 on the tie rod will move over the king pins 15, 16 when the wheels 10, 11 are steered to extreme positions. My patent utilizes that arrangement to allow steering of the wheels through a very wide angle, but the novel construction that I shall now describe enables me to achieve an even wider steering angle.

In the form of my invention that I prefer and that I show in the drawings, I utilize a sliding plunger 25 on each end portion 23, 24 of the tie rod 20. As is well shown in FIGURE 1, each plunger 25 has a stem portion 26 extending through an opening in tie rod 20, and is mounted to slide on the rod while in opposed relation to a surface 27 of one wheel mounting 17, 18. A coil spring 28 is assembled on the stem portion 26 of each plunger 25 and acts between the tie rod 20 and plunger 25 to press the plunger toward the surface 27 of the corresponding wheel mounting. A nut 29 on the stem of each plunger 25 holds the plunger and its spring in a normal position relatively to the rod 20.

It will be appreciated that one end portion 23 or 24 of the tie rod will move toward the corresponding wheel mounting 17 or 18 as the wheels are steered to one extreme position or the other. That movement is shown for example at the left side of FIGURE 1, the tie rod portion 23 being moved toward the wheel mounting 17. Each plunger 25 is so positioned on its rod portion 23 or 24 that the plunger will move into contact with the surface 27 on the corresponding wheel mounting as the wheels are steered near their extreme position, with the plunger compressed by that surface 27 during a final part of the steering to extreme position. I may call attention here to the fact that the plungers 25 actually will leave the steering free as the wheels are steered through a wide angle.

When a spring-pressed plunger 25 has been compressed, that plunger will apply pressure between the tie rod 20 and corresponding wheel mounting for moving the tie rod 20 in a direction away from the king pin 15 or 16. That enables me to design the tie rod 20 to move practically into a dead center relation to each king pin 15, 16, with the linear force vector of tie rod 20 very near or actually on the steering axis of one wheel or the other. The plungers 25 then will be effective to move the tie rod 20 away from the steering axes, so that the rod will not lock the steering mechanism and wheels in their extreme positions. It will be appreciated, therefore, that I am able to increase very substantially the angle through which a pair of wheels can be steered while using a tie rod to hold them in alignment.

For the purposes of disclosure, I show a link 30 through which a steering arm 31 may actuate the tie rod 20 in order to steer the wheels 10, 11. Actually, the particular means that apply the steering force are not important to an understanding of my invention. The steering may, for example, be effected through means like that shown in my earlier patent, with an arm on one of the wheel mounting members 17, 18. Such an arm will act positively to move one end of the tie rod 20 out of dead center position, so that I may use merely one spring-pressed plunger 25 that will move the opposed end of the rod. Therefore, I do not wish to be limited to the utilization of spring means for moving both end portions of a tie rod. It is merely necessary to understand that my invention will enable a steering rod to move away from a dead center position, so that the rod can be used in mechanism that effects exceedingly wide angle steering.

Those persons skilled in the art will now understand the operation and the very considerable advantages of my novel steering mechanism. Therefore, I believe that the value of my contribution to the industrial truck art will be fully appreciated.

I now claim:

1. In a steering system of the class described including a pair of opposed steered wheels, a mounting member mounting each of said wheels for steering rotation about a predetermined axis, a tie rod having opposed ends pivoted to said mounting members for rotating the members to steer said wheels about their steering axes, the tie rod pivots being so positioned relatively to said axes on said mounting members that in each extreme steering position of said wheels said tie rod approaches dead center relation to the steering axis of one wheel, a portion of said tie rod moving toward a surface on one wheel mounting member as said tie rod approaches dead center relation to one steering axis or the other, spring pressed plungers on said portions of the tie rod in position to be depressed by said surfaces on the mounting members during a final part of the steering of the wheels to their extreme positions, and means holding said plungers spaced from said surfaces as the wheels are steered to other positions, so that said plungers normally will leave the steering free, while effective to aid movements of the tie rod in a direction away from dead center relation to each axis.

2. In a steering system of the class described including a pair of opposed steered wheels, a mounting member mounting each of said wheels for steering rotation about a predetermined axis, a tie rod having opposed ends pivoted to said mounting members for rotating the members to steer said wheels about their steering axes, the tie rod pivots being so positioned relatively to said axes on said mounting members that in each extreme steering position of said wheels said tie rod approaches dead center relation to the steering axis of one wheel, a portion of said tie rod moving toward a surface on one wheel mounting member as said tie rod approaches dead center relation to one steering axis or the other, spring pressed plungers mounted on said portions of the tie rod and spaced relatively to said surfaces on the mounting members while the wheels are steered through considerable angles toward their extreme positions, and means holding said plungers in position to be depressed relatively to the tie rod by said surfaces on the members during a final part of the steering of the wheels to their extreme positions, so as to aid movements of the tie rod in a direction away from dead center relation to each axis.

3. In a steering system of the class described,
a steerable wheel,
means mounting said wheel for steering rotation about a predetermined axis,
a steering link pivotally attached to said steerable wheel at a point spaced from said predetermined axis whereby steering torque may be applied through said link to said wheel for rotating said steerable wheel about said predetermined axis, said wheel being rotatable about said predetermined axis by said steering link to an extreme position in which said steering link is in a substantially dead center position relatively to said predetermined axis whereby extremely sharp steering of said wheel is attained, and
energy storing means operatively connected to and energized only by movement of said wheel to said extreme position by said link, said energy storing means being inoperative during the major portion of the steering movement of said wheel to said extreme position, said energy storing means releasing the stored energy to rotate said wheel away from said extreme position when the steering force on said steering link is relieved whereby said steering link is moved out of said substantially dead center position relatively to said predetermined axis.

References Cited in the file of this patent

UNITED STATES PATENTS

| 1,834,883 | Welikes | Dec. 1, 1931 |
| 2,820,644 | Smith | Jan. 21, 1958 |
| 2,829,903 | Ulinski | Apr. 8, 1960 |

FOREIGN PATENTS

| 290,278 | Germany | Feb. 16, 1916 |
| 611,081 | Germany | Mar. 21, 1935 |
| 458,581 | Italy | July 20, 1950 |